US011861763B2

(12) United States Patent
Echevarria Vallespi

(10) Patent No.: US 11,861,763 B2
(45) Date of Patent: Jan. 2, 2024

(54) CONTRAST RATIO COLOR PICKER

(71) Applicant: Adobe Inc., San Jose, CA (US)

(72) Inventor: Jose Ignacio Echevarria Vallespi, Belmont, CA (US)

(73) Assignee: Adobe Inc., San Jose, CA (US)

( * ) Notice: Subject to any disclaimer, the term of this patent is extended or adjusted under 35 U.S.C. 154(b) by 151 days.

(21) Appl. No.: 17/235,067

(22) Filed: Apr. 20, 2021

(65) Prior Publication Data

US 2022/0335662 A1 Oct. 20, 2022

(51) Int. Cl.
*G06T 11/00* (2006.01)

(52) U.S. Cl.
CPC .................. *G06T 11/001* (2013.01)

(58) Field of Classification Search
None
See application file for complete search history.

(56) References Cited

U.S. PATENT DOCUMENTS

| | | | |
|---|---|---|---|
| 5,754,184 | A | 5/1998 | Ring et al. |
| 7,184,063 | B2 | 2/2007 | Shum et al. |
| 8,264,499 | B1 | 9/2012 | Andry et al. |
| 10,319,116 | B1 | 6/2019 | C et al. |
| 11,386,590 | B1 * | 7/2022 | Bonfiglio ............. G06T 11/001 |
| 11,651,530 | B2 | 5/2023 | Echevarria Vallespi et al. |

| | | | |
|---|---|---|---|
| 2002/0186222 | A1 | 12/2002 | Morton et al. |
| 2011/0074807 | A1 | 3/2011 | Inada et al. |
| 2018/0357231 | A1 * | 12/2018 | Kraft .................. G06F 16/5838 |
| 2019/0005016 | A1 * | 1/2019 | Hamlin ................ G06F 40/166 |
| 2022/0405988 | A1 | 12/2022 | Echevarria Vallesp et al. |

OTHER PUBLICATIONS

Stephanie Walter, "Tips to Create an Accessible and Contrasted Color Palette"; 2019, https://stephaniewalter.design/blog/tips-create-accessible-color-palette/?nowprocket=1 (Year: 2019).*
Scott Vinkle, "Testing Color Design for Accessibility", Nov. 13, 2018, https://scottvinkle.me/blogs/work/color-contrast (Year: 2018).*
Adobe, "Adobe Photoshop 6.0", 2000, http://kfrserver.natur.cuni.cz/obecne/soubory/PhotoShop6/UserGuide.pdf (Year: 2000).*

(Continued)

*Primary Examiner* — Sarah Le
(74) *Attorney, Agent, or Firm* — FIG. 1 Patents

(57) ABSTRACT

A contrast ratio color picker system is described that generates, based on a selected color, a contrast ratio color picker that presents a filtered palette of colors satisfying a contrast ratio threshold, relative to the selected color. To do so, the contrast ratio color picker system computes a relative luminance value for the selected color and identifies a contrast ratio threshold for the digital content. The contrast ratio color picker system then selects a palette from a target color space and generates a filtered palette by masking pixels displaying colors of the target color space palette that fail to satisfy the contrast ratio threshold. The filtered palette is then output as part of the contrast ratio color picker, which enables application of colors selected from the filtered palette to digital content.

20 Claims, 8 Drawing Sheets
(5 of 8 Drawing Sheet(s) Filed in Color)

(56) References Cited

OTHER PUBLICATIONS

RandomMomentania, "Godot Color Mask Tutorial", Jul. 13, 2019, https://randommomentania.com/2019/07/godot-color-mask-tutorial/ (Year: 2019).*

Hogue, "Evaluate Your Company Brand Color Palette for Accessibility", Nov. 20, 2019 https://www.oomphinc.com/inside-oomph/evaluate-brand-colors-for-accessibility/ (Year: 2019).*

Anuj Malhotra, Color Wheel Basics: How To Choose the Right Color Scheme for your PowerPoint Slides, Sep. 10, 2015 (Year: 2015).*

"CIE 1931 color space", Wikipedia, The Free Encyclopedia [retrieved Apr. 13, 2021]. Retrieved from the Internet <https://en.wikipedia.org/wiki/CIE_1931_color_space>., 16 pages.

"Color Wheel—A Color Palette Generator", Adobe Inc., Adobe Color [online][retrieved May 5, 2021]. Retrieved from the Internet <https://color.adobe.com/create/color-wheel>., 2 pages.

"Contrast (Minimum): Understanding SC 1.4.3", W3C Working Group Note, Understanding WCAG 2.0 [retrieved Apr. 13, 2021]. Retrieved from the Internet <https://www.w3.org/TR/UNDERSTANDING-WCAG20/visual-audio-contrast-contrast.html#contrast-ratiodef>., 2016, 7 pages.

"Contrast Checker", Web AIM Website [retrieved Apr. 13, 2019]. Retrieved from the Internet <https://webaim.org/resources/contrastchecker/>., 2 pages.

"Introducing Stark Smart Suggestions", Uploaded by Stark [retrieved Apr. 13, 2021]. Retrieved from the Internet <https://www.youtube.com/watch?v=lqVJeXjpCXk>., Sep. 15, 2020, 3 pages.

U.S. Appl. No. 17/354,611, "Non-Final Office Action", U.S. Appl. No. 17/354,611, dated Nov. 23, 2022, 32 pages.

U.S. Appl. No. 17/354,611, "Notice of Allowance", U.S. Appl. No. 17/354,611, dated Feb. 6, 2023, 8 pages.

Stone, M.C., "Representing Colors as Three Numbers", IEEE Computer Graphics and Applications [retrieved Dec. 6, 2022]. Retrieved from the Internet <https://doi.org/10.1109/MCG.2005.84>, Jul. 11, 2005, 8 pages.

U.S. Appl. No. 17/354,611, "Supplemental Notice of Allowability", U.S. Appl. No. 17/354,611, dated Apr. 13, 2023, 2 pages.

* cited by examiner

CONTRAST RATIO COLOR PICKER

BACKGROUND

Color selection is a critical aspect of digital content creation. To aid creators in the digital content creation process, color pickers are used to display a color palette, from which a color is selectable for application to digital content. Conventional color pickers, however, are limited in that they display only a small subset of the millions of different colors capable of being applied to digital content, where the subset is further restricted based on a size of a display device at which the color picker is output. For instance, conventional color pickers often display a cross section of a color gamut geometry, such as a cross section of an RGB cube gamut, an HSV cylinder gamut, an HSL cone gamut, and so forth.

Color accessibility depends on the contrast ratio between two colors, which is determined based on the colors' relative luminance values. Conventional color pickers are designed to enable selection of a single color and enable limited controls for navigating the corresponding color gamut geometry, but do not provide direct control over relative luminance values. Consequently, selection of accessible color pairs using conventional color pickers requires cumbersome trial and error, as each of the limited controls affects relative luminance in a different manner.

SUMMARY

A contrast ratio color picker system is described that generates, based on an indication of a selected color to be applied to digital content, a contrast ratio color picker that presents a filtered palette including colors that satisfy a contrast ratio threshold relative to the selected color. To do so, the contrast ratio color picker system computes a relative luminance value for the selected color and identifies a contrast ratio threshold for the digital content. The contrast ratio color picker system is configured to automatically identify the contrast ratio threshold based on a type of digital content to which the selected color is applied. Given the relative luminance value and contrast ratio threshold, the contrast ratio color picker system selects a palette from a target color space to be used for the contrast ratio color picker, such as a cross section of an RGB cube, a cross section of an HSV cylinder, a cross section of a xyY color gamut geometry, and so forth.

The target color space palette is then processed on a per-pixel basis, based on a resolution of a display outputting the contrast ratio color picker, to generate a filtered palette. In contrast to the target color space palette, the filtered palette masks, visually obscures, or otherwise excludes display of pixels including colors that fail to satisfy the contrast ratio threshold relative to the selected color. The filtered palette is then output as part of the contrast ratio color picker, thereby readily informing a digital content designer as to available color options for use with the selected color that satisfy contrast ratio constraints. The contrast ratio color picker is further configured to include one or more parameter controls for adjusting the selected color, the relative luminance value, the contrast ratio threshold, and parameters that define the target color space palette. The contrast ratio color picker system is further configured to enable application of colors selected from the filtered palette to digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In some implementations, entities represented in the figures are indicative of one or more entities and thus reference is made interchangeably to single or plural forms of the entities in the discussion.

DETAILED DESCRIPTION

Overview

Figure 1:
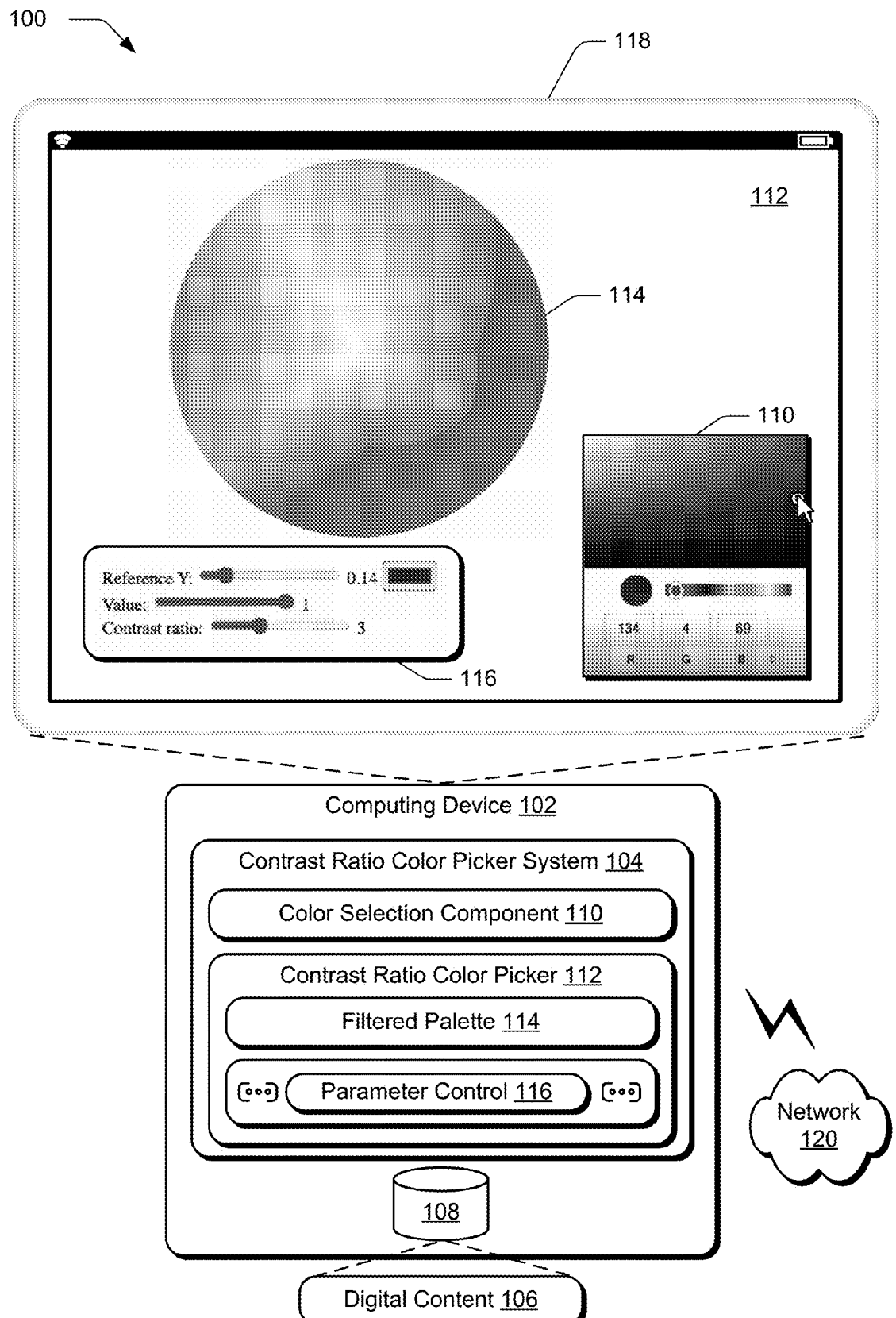
FIG. 1 is an illustration of an environment in an example implementation that is operable to employ generation of a contrast ratio color picker based on a selected color in accordance with techniques described herein.

Digital content creators often use color pickers to select colors in the digital content creation process, such as selecting color to be applied to a digital image as part of an image editing process, selecting color to be applied to text, selecting color to be applied as text background, and so forth. Conventional color pickers, however, focus on selection of a single color, and do not consider how different color selections appear with one another when integrated into digital content. Consequently, utilizing conventional color pickers in the digital content creation process produces digital content having a visual appearance that is difficult, if not impossible, for many individuals to perceive.

For instance, individuals with often have difficulty reading text that does not contrast with its background. This difficulty is exacerbated if the individual suffers from a color vision deficiency that lowers the contrast between foreground and background even further. Providing a minimum luminance contrast ratio between foreground and background colors makes text more readable for individuals who are unable to perceive the full range of colors as well as individuals who are unable to perceive color. However, conventional color pickers offer no indication as to a resulting contrast ratio from different colors when presented together, much less identify colors that satisfy a contrast ratio threshold relative to a selected color. As such, conventional color pickers force content creators to compute a contrast ratio for each potential color pair before ultimately selecting a color pair to be used in their design.

To address these issues, techniques for generating a contrast ratio color picker based on a selected color are described. In one example, a contrast ratio color picker system identifies a color selected as part of a digital content creation process, such as a color for stylizing a display of text, a color for digital graphics, and so forth. The contrast ratio color picker system identifies a relative luminance value of the selected color, as well as a contrast ratio relative to the selected color for use in the content creation process. In implementations, the contrast ratio color picker system automatically identifies a contrast ratio threshold based on a type of digital content to which the selected color is applied.

For instance, text that is larger and has wider character strokes is easier to read by a viewing user at lower contrast than small text that is smaller with narrow character strokes. Similarly, graphics that do not include legible text content is easier to identify and comprehend by a viewing user at an even lower contrast relative to small text. Accounting for this relative ease in readability and comprehension, the contrast ratio color picker system automatically designates an appropriate contrast ratio threshold for the digital content to which the selected color is applied.

Given the relative luminance value and the contrast ratio threshold, the contrast ratio color picker system is configured to compute the contrast ratio between the selected color and every other color inside a color gamut to identify colors that fail to satisfy the contrast ratio threshold. However, because color gamuts include millions of different colors (e.g., there are 16,777,216 colors inside a 24-bit color gamut), the corresponding number of contrast ratio computations requires significant time and computational resources to complete. To mitigate the requisite computational resources, the contrast ratio color picker selects a palette comprising a subset of colors from the color gamut, such as a plane of color representing a cross section of a color gamut geometry.

The contrast ratio color picker further identifies a resolution of a display device configured to output the color palette, and computes the contrast ratio between the selected color and each color in the color palette on a per-pixel basis, thereby performing a minimum number of computations as required by the display device resolution. Colors failing to satisfy the contrast ratio threshold are then masked, visually occluded, or otherwise obscured to generate a filtered palette that displays only colors satisfying the contrast ratio threshold. The filtered palette consisting colors satisfying the contrast ratio threshold is then output as part of a contrast ratio color picker, which enables a designer to readily identify a range of colors that are useable together with the selected color in creating the digital content while maintaining the contrast ratio threshold for the particular type of digital content. The contrast ratio color picker system is further configured to output the contrast ratio color picker with parameter controls that enable a user to modify the selected color, the relative luminance value, the threshold contrast ratio, and/or parameters defining the color space palette used to generate the filtered palette, thereby offering increased color selection functionality relative to conventional color pickers. Further discussion of these and other examples is included in the following sections and shown in corresponding figures.

Term Examples

As used herein, the term "color" refers to a property that distinguishes among different kinds of light, defined in terms of human perception, and technically described as recognized by a viewer in terms of hue, luminance and saturation. Luminance refers to the brightness of the light, while hue refers to the visual property that distinguishes different colors from one another (e.g., red from pink, blue from purple, green from yellow, and so forth), and saturation refers to how pure a color is relative to its grey version.

As used herein, the term "relative luminance" refers to the relative brightness of any point in a color space, normalized to zero for a darkest black in the color space and one for a lightest white in the color space. In certain color spaces where relative luminance is explicitly represented, such as the XYZ and xyY color spaces, relative luminance is represented by "Y."

As used herein, the term "contrast ratio" refers to a ratio of the relative luminances of foreground and background colors, such as text rendered on a background. Contrast ratio is represented as Y1/Y2, where Y1 represents the relative luminance of the lighter of the colors and Y2 is the relative luminance of the darker of the colors. In some implementations, contrast ratio is represented using an offset value to compensate for contrast ratios that occur when a relative luminance value is at or near zero, for ambient light effects, and so forth. As an example, an offset value of 0.05 results in representing contrast ratio as ((Y1+0.05))/((Y2+0.05)). Contrast ratios can range from 1 (commonly expressed as 1:1) and 21 (commonly expressed as 21:1).

As used herein, the term "color gamut" refers to the full range of colors in a color space visible to the human eye. As used herein, the term "color space" refers to one or more standards that define color gamut constraints relative to display devices, which are limited in ability to produce each and every color of the entire color gamut. Example color spaces include RGB, HSL, HSV, CMYK, LAB, XYZ, xyY, and so forth.

The "RGB" color space specifies a color value with red, green, and blue (red, green, blue) parameters. Each parameter defines the intensity of the corresponding color as an integer between zero and 255. For example, rgb(0, 0, 255) is rendered as blue, because the blue parameter is set to its highest possible value while the red and green parameters are set to zero.

The "HSL" color space specifies a color value with hue, saturation, and lightness parameters. Hue specifies a degree on the color wheel ranging from 0 to 360, where 0 corresponds to red, 120 corresponds to green, and 240 corresponds to blue. Saturation specifies a percentage value between 0% and 100%, inclusive, where 0% represents a shade of gray and 100% represents the full color. Lightness specifies a percentage value between 0% and 100%, inclusive, where 0% represents black and 100% represents white.

The "HSV" color space is similar to HSL in its use of hue and saturation parameters, differing by using a value parameter instead of a lightness parameter, where the value parameter is a percentage value between 0% and 100%, inclusive, indicating how the color appears under light. The difference between HSL and HSV is that a color with maximum lightness in the HSL color space is pure white, while a color with a maximum value parameter in the HSV color space is analogous to shining a bright white light on a colored object (e.g., shining a bright white light on a red object causes the object to appear brighter and more intense, but still red, while shining a dim light on the red object causes the object to appear darker and less bright, but still red). In both HSL and HSV color spaces, colors of each hue are arranged in a radial slice around a central axis of neutral colors ranging from black at the bottom to white at the top.

The "CMYK" color space specifies a color as a combination of cyan, magenta, yellow, and black parameters. Each parameter specifies a percentage value from 0% to 100%, inclusive, where 0% represents white and 100% represents the full corresponding color of cyan, magenta, yellow, or black.

The "LAB" color space specifies a color value using three parameters (L, a, and b) relative to a three-axis system. The a-axis ranges from green to red, with the "a" parameter specifying a position on the a-axis. The b-axis ranges from blue to blue to yellow, with the "b" parameter specifying a position on the b-axis. The L-axis ranges from black to white, with the "L" parameter specifying a position on the L-axis.

The "XYZ" color space refers to a mapping of colors resulting from experiments conducted to identify all the colors visible to an average human, and is also referred to as the 1931 CIEXYZ color space. The XYZ color space represents a color value in terms of a three-axis system, where the Y-axis corresponds to relative luminance and the Y parameter specifies a position on the Y-axis. The X and Z axes represent how cones in the human eye respond to light waves of varying frequencies, quantified in terms of tristimulus values, and thus the XYZ color space provides a device-invariant representation of color. Because the human eye has three types of color sensors that respond to different ranges of wavelengths, plotting the XYZ color space results in a three-dimensional color gamut geometry. The "xyY" color space refers to a transformation of the XYZ color space to two-dimensional coordinates, where the "x" and "y" parameters specify the chromaticity of a color and the "Y" parameter specifies the relative luminance of the color. Via the mapping provided by the xyY color space, the X and Z tristimulus values in the XYZ color space can be calculated back from the chromaticity values and the relative luminance value.

In the following discussion, an example environment is described that is configured to employ the techniques described herein. Example procedures are also described that are configured for performance in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. As used herein, the term "digital medium environment" refers to the various computing devices and resources utilized to implement the techniques described herein. The digital medium environment 100 includes a computing device 102, which is configurable in a variety of manners.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to low-resource devices with limited memory and/or processing resources (e.g., mobile devices). Additionally, although a single computing device 102 is shown, the computing device 102 is representative of a plurality of different devices, such as multiple servers utilized by a business to perform operations "over the cloud."

The computing device 102 includes a contrast ratio color picker system 104. The contrast ratio color picker system 104 is implemented at least partially in hardware of the computing device 102 to process digital content 106, which is illustrated as maintained in a storage device 108 of the computing device 102, in order to identify a color selection made at a color selection component 110 and generate a contrast ratio color picker 112 based on the color selection. The digital content 106 is representative of any form of digital content configured for display by a computing device, such as text data, vector graphic data, raster image data (e.g., rasterized graphic data, bitmap image data, etc.), combinations thereof, and so forth.

The contrast ratio color picker 112 includes a filtered palette 114, which consists of a display of one or more colors that satisfy a contrast ratio threshold relative to the selected color indicated by the color selection component 110. For instance, responsive to detecting a selection via the color selection component 110 of a color to be applied to the digital content 106, the contrast ratio color picker system 104 is configured to output the filtered palette 114 as displaying only colors that satisfy a contrast ratio threshold for the digital content 106. As an example, if the selected color is detected for application to text content displayed in the user interface 118, the filtered palette 114 is generated to display colors that are useable for a background against which the text content is displayed. To ensure that a contrast ratio threshold is satisfied, colors failing to satisfy the contrast ratio threshold relative to the selection indicated at the color selection component 110 are masked and prevented from being selected via the filtered palette 114.

The contrast ratio color picker 112 is further configured to include at least one parameter control 116, which is useable to modify a corresponding parameter that dictates output of the filtered palette 114, which is displayed together with the color selection component 110 and the filtered palette 114 in a user interface 118 for the contrast ratio color picker system 104. Example parameters modifiable by the at least one at least one parameter control 116 include a relative luminance of the selected color, the contrast ratio threshold, a color space parameter for the filtered palette 114, and so forth. Although illustrated as implemented locally at the computing device 102, functionality of the contrast ratio color picker system 104 is implementable in whole or in part via functionality available via the network 120, such as part of a web service or "in the cloud," as described in further detail below with respect to FIG. 8.

The contrast ratio color picker system 104 is thus configured to generate a contrast ratio color picker 112 that readily informs a designer, during the content creation process, as to colors that are useable together to maintain an acceptable contrast ratio in digital content, and precludes the designer from selecting color combinations that fail to achieve an acceptable contrast ratio.

In general, functionality, features, and concepts described in relation to the examples above and below are employable in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are configured to be applied together and/or combined in different ways. Thus, individual functionality, features, and concepts described in relation to different example environments, devices, components, figures, and procedures herein are useable in any suitable combinations and are not limited to the combinations represented by the enumerated examples in this description.

Color Picker Generation from a Selected Color and Contrast Ratio Threshold

Figure 2:
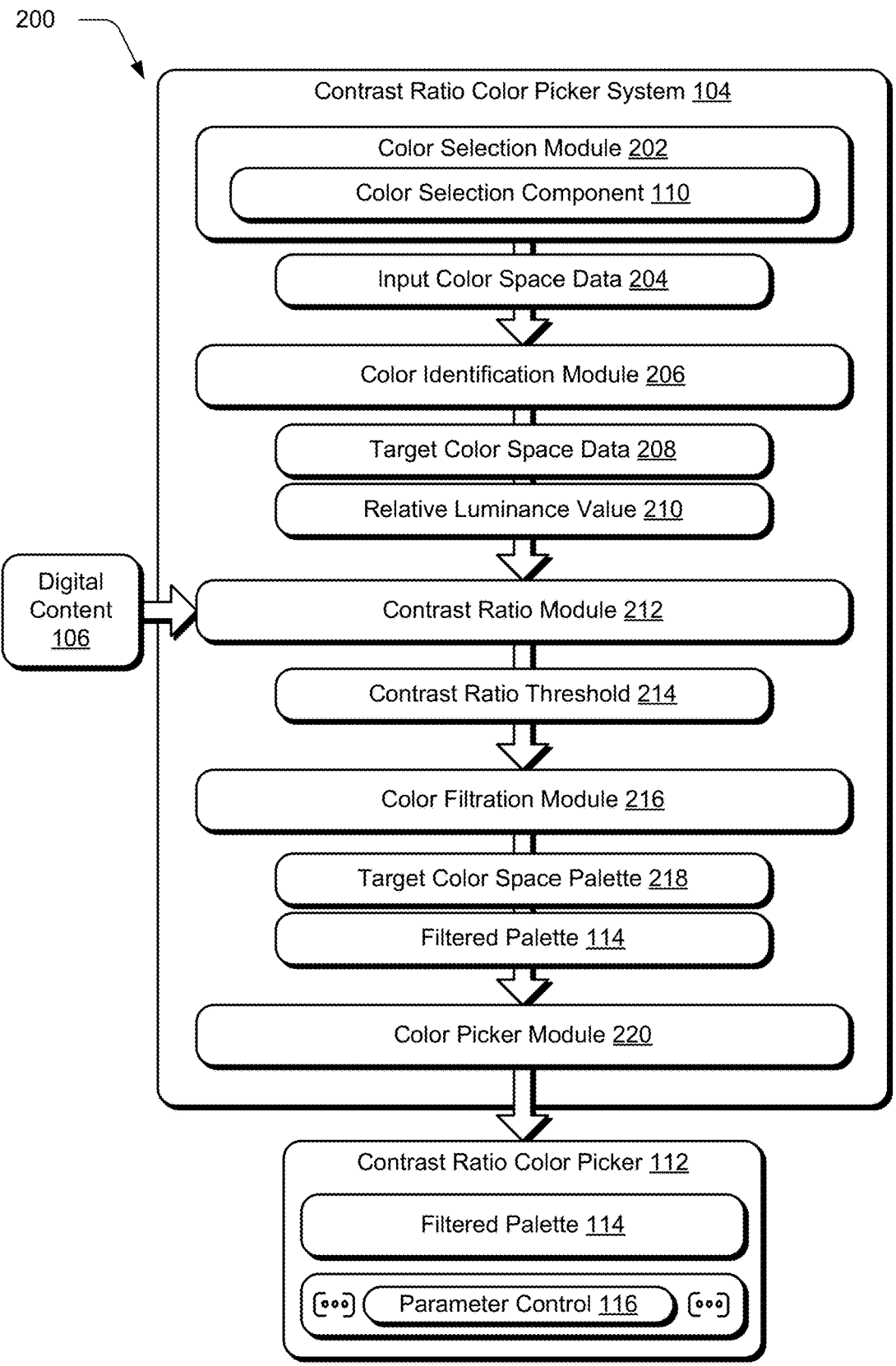
FIG. 2 depicts a system in an example implementation showing operation of the contrast ratio color picker system of FIG. 1 in greater detail.

FIG. 2 depicts a system 200 in an example implementation showing operation of the contrast ratio color picker system 104 of FIG. 1 in greater detail. To begin in this example, a color selection module 202 is employed by the contrast ratio color picker system 104, which implements the color selection component 110. The color selection component 110 is representative of functionality of the contrast ratio color picker system 104 to expose one or more colors of a color space for selection (e.g., via user input at a computing device implementing the contrast ratio color picker system 104) and application to digital content 106.

Although illustrated as implemented by the color selection module 202, the color selection component 110 is alternatively implemented by a software application separate from the contrast ratio color picker system 104, as described in further detail below with respect to FIG. 8. For instance, in accordance with one or more implementations, the color selection component 110 is representative of native functionality provided by a word processing application (e.g., enabling selection of one or more colors to be applied to font or a font background), a digital graphics application (e.g., enabling selection of one or more colors to be applied to vector-based and/or raster-based digital content), combinations thereof, and so forth. The color selection component 110 is thus configurable in a variety of different manners to enable selection of a color for application to digital content 106.

In some implementations, the color selection component 110 includes controls that enable designation of a color space model displayed by the color selection component 110, controls that enable designation of various parameters for specifying which subset of colors of the color space are currently displayed by the color selection component 110, combinations thereof, and so forth. The color selection component 110 is thus configurable in a variety of different manners to enable selection of a color for application to digital content 106, and is representative of functionality implemented natively by the contrast ratio color picker system 104 as well as functionality offered by an application implemented separately from the contrast ratio color picker system 104.

The color selection module 202 is configured to monitor input detected at the color selection component 110 and identify a color selection based on the monitoring, such as a selection indicating a color to be applied to digital content 106. Responsive to identifying the color selection via the color selection component 110, the color selection module 202 generates input color space data 204 for the color selection. For instance, in an example implementation where the color selection component 110 is configured to display a subset of colors from an RGB color space, the input color space data 204 is generated to include corresponding values for the Red, Blue, and Green components identifying the color selection from the color selection component 110. Similarly, in another example implementation where the color selection component 110 is configured for an HSL color space, the input color space data 204 includes values for Hue, Saturation, and Lightness components that identify the color selection from the color selection component 110. As a further example, in an implementation where the color selection component 110 is configured for a CMYK color space, the input color space data 204 includes values for Cyan, Magenta, Yellow, and Black components that identify the color selection from the color selection component 110. Thus, the input color space data 204 is representative of information that identifies a color selected from the color selection component 110, where a format of the input color space data 204 is dependent on a color space for which the color selection component 110 is configured.

The color selection module 202 is configured to provide the input color space data 204 to a color identification module 206, which is representative of functionality of the contrast ratio color picker system 104 to optionally convert the input color space data 204 to a color space of the contrast ratio color picker 112, as represented by the target color space data 208. For instance, in an example implementation where the color selection component 110 is configured for the RGB color space and the contrast ratio color picker 112 is configured for the HSV color space, the color identification module 206 is configured to convert the RGB values represented by the input color space data 204 to values for each of the Hue, Saturation, and Value components of a same color as represented in the HSV color space, and output the converted values as the target color space data 208.

The color identification module 206 is further representative of functionality of the contrast ratio color picker system 104 to determine a relative luminance value 210 for the color selected from the color selection component 110. The color identification module 206 is configured to determine the relative luminance value 210 from either the input color space data 204 or the target color space data 208, and a particular manner in which the relative luminance value 210 is determined depends on the color space corresponding to the input color space data 204 or the color identification module 206 used to determine the relative luminance value 210. For instance, in an example implementation where the relative luminance value 210 is determined based on data identifying a selected color in the context of a color space where relative luminance is explicitly represented (e.g., the XYZ color space, the xyY color space, and so forth), the relative luminance value 210 is determined from the corresponding Y value as set forth in the input color space data 204 or the target color space data 208.

Alternatively, in an example implementation where the relative luminance value 210 is determined from a color space that does not explicitly represent relative luminance, the color identification module 206 is configured to compute the relative luminance value 210 from the input color space data 204 or the target color space data 208. The color identification module 206 is configured to compute the relative luminance value 210 using any one or combination of relative luminance computation techniques. As an example, in an implementation where the input color space data 204 or target color space data 208 used to compute the relative luminance value 210 is expressed in the context of the RGB color space, the color identification module 206 computes the relative luminance value 210 according to Equation 1:

$$Y=0.2126R+0.7152G+0.0722B \quad \text{(Eq. 1)}$$

As set forth in Equation 1, Y represents the relative luminance value 210 and R, G, and B represent the Red, Green, and Blue color space values as set forth in one or more of the input color space data 204 or the target color space data 208. Equation 1 thus reflects the significance of each color space attribute with respect to luminosity, where green light contributes the most to the intensity of a color as perceived by human viewers and blue light contributes the least to the perceived intensity.

The color identification module 206 is then configured to provide the target color space data 208 and the relative luminance value 210 to a contrast ratio module 212. The contrast ratio module 212 is representative of functionality of the contrast ratio color picker system 104 to generate a contrast ratio threshold 214, which represents a value ranging from one to 21, inclusive. The contrast ratio threshold 214 defines a minimum contrast ratio for use in applying the color selected from the color selection component 110 against a different color (e.g., for use in applying the selected color to a foreground element against a different background color, or vice versa) in digital content 106.

In some implementations, the contrast ratio threshold 214 is specified manually via user input at a computing device implementing the contrast ratio color picker system 104. Alternatively, in some implementations the contrast ratio threshold 214 is determined automatically by the contrast ratio color picker system 104 (e.g., independent of user input or intervention) based on a type of digital content 106 to which the color selected from the color selection component 110 is applied.

For instance, the contrast ratio module 212 is configured to identify whether the color selection component 110 is used apply the selected color to graphics (e.g., vector graphics, raster graphics, and the like), large text, or small text digital content 106 and automatically determine the contrast ratio threshold 214 based on the identified type of digital content 106. As an example, the contrast ratio module 212 designates the contrast ratio threshold 214 as three (e.g., specifying a 3:1 contrast ratio) responsive to determining that the color selected from the color selection component 110 is to be applied to graphics digital content 106. As another example, the contrast ratio module 212 designates the contrast ratio threshold 214 as 4.5 (e.g., specifying a 4.5:1 contrast ratio) responsive to determining that the color selection component 110 is used to select a color for large text digital content 106. As yet another example, the contrast ratio module 212 designates the contrast ratio threshold 214 as seven (e.g., specifying a 7:1 contrast ratio) responsive to determining that the color selection component 110 is used to designate a color for small text digital content 106.

In accordance with one or more implementations, the contrast ratio module 212 is configured to differentiate between small text and large text digital content 106 based on characteristics of text digital content 106 to which a selected color is applied (e.g., as a font color for the text or as a color for a background against which the text is displayed). For instance, the contrast ratio module 212 is configured to classify digital content 106 as large text responsive to determining that the color selected from the color selection component 110 is to be applied to font that is bold and size 14-point (e.g., 18.667 pixels) or larger, as well as font that is size 18-point (e.g., 24 pixels) or larger independent of bolding. Conversely, the contrast ratio module 212 is configured to classify text digital content 106 that does not satisfy large text font size thresholds as small text.

Figure 3:
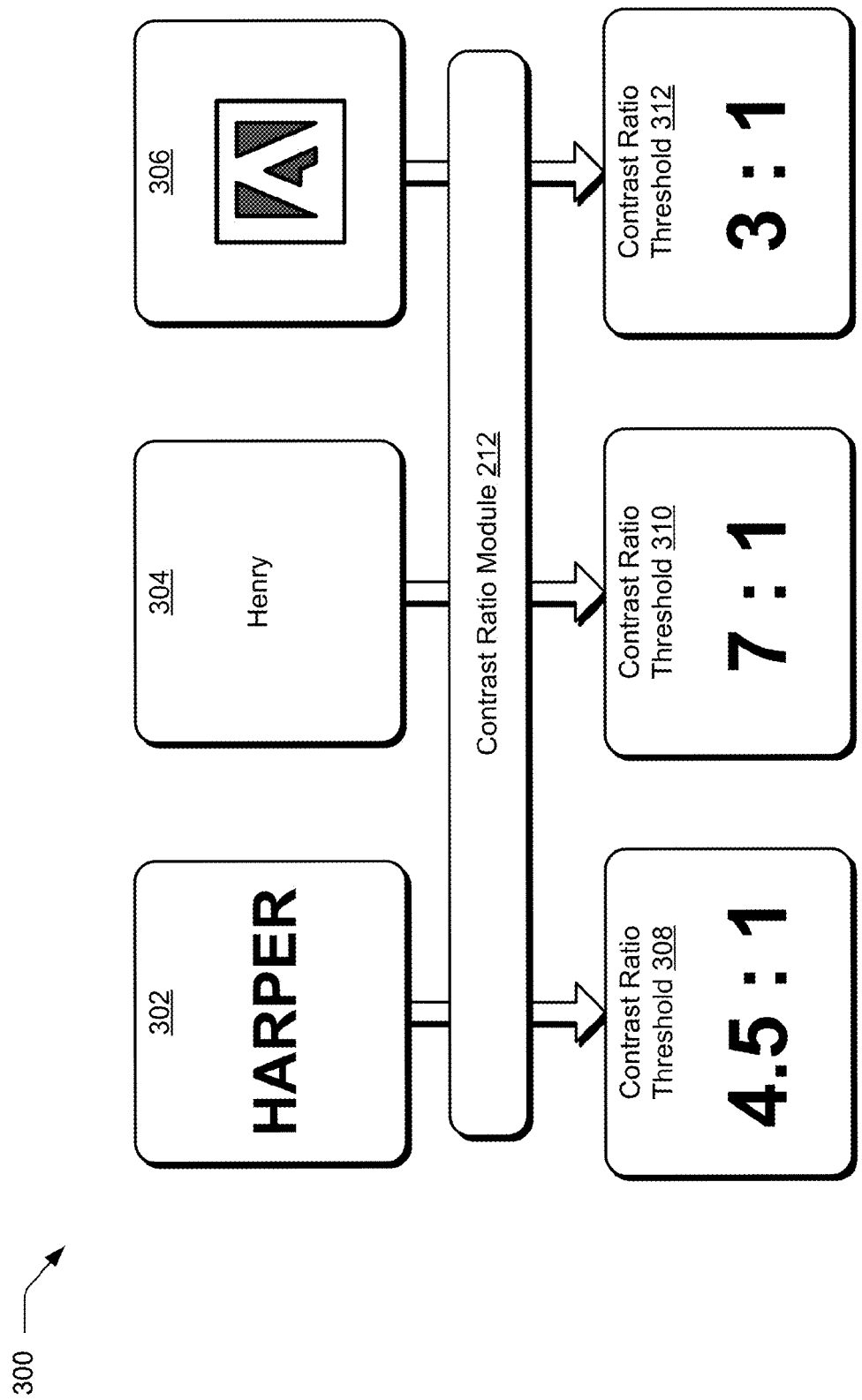
FIG. 3 depicts an example implementation showing operation of a contrast ratio module implemented by the contrast ratio color picker system of FIG. 1 in greater detail.

As shown in the example implementation 300 of FIG. 3, the contrast ratio module 212 is configured to automatically designate different contrast ratio thresholds 214 for a color selected from the color selection component 110, based on a type of digital content 106 for which the selected color is to be applied. In the example implementation 300, digital content 302 represents an example instance of large text digital content, with the characters "HARPER" displayed in a size 26-point, bold font. Digital content 304 represents an example instance of small text digital content, with the characters "Henry" displayed in size 12-point font. Digital content 306 represents an example instance of graphics digital content.

As evidenced by the example implementation 300, text that is larger and has wider character strokes is easier to read by a viewing user at lower contrast. Similarly, graphics that do not include legible text content is easier to identify and comprehend by a viewing user at an even lower contrast relative to small text. Accounting for this relative ease in readability and comprehension, the contrast ratio module 212 automatically designates an appropriate contrast ratio threshold 214 for the digital content 106 to which a color selection from the color selection component 110 is to be applied.

For instance, responsive to determining that the color selection represented by the input color space data 204 is to be applied to the characters, or the background against which the characters are disposed, in digital content 302, the contrast ratio module 212 automatically designates the contrast ratio threshold 308 of 4.5 for use in generating the contrast ratio color picker 112. Alternatively, responsive to determining that the selected color from the color selection component 110 is to be applied to the characters or the background of the digital content 304, the contrast ratio module 212 automatically designates the contrast ratio threshold 310 of seven for use in generating the contrast ratio color picker 112. Alternatively, responsive to determining that the color selection from the color selection component 110 is to be applied to a fill, line, or background of digital content 306, the contrast ratio module 212 automatically designates the contrast ration threshold 312 of three for use in generating the contrast ratio color picker 112.

In this manner, the contrast ratio thresholds 214 automatically determined by the contrast ratio module 212 are based on type of digital content 106 to which a color selection is being applied. Although described herein in the example implementations of pre-configured thresholds of seven for small text, 4.5 for large text, and three for graphics, the contrast ratio threshold 214 automatically assigned by the contrast ratio module 212 is representative of any suitable contrast ratio value, which in implementations is specified by a developer of the contrast ratio color picker system 104. Alternatively or additionally, the contrast ratio threshold 214 is designated based on a type of digital content 106 to which a selected color is applied are pre-specified (e.g., prior to presentation of the color selection component 110) by a user of a computing device implementing the contrast ratio color picker system 104.

The contrast ratio threshold 214 is provided to a color filtration module 216, which is representative of functionality of the contrast ratio color picker system 104 to identify a target color space palette 218, which is representative of a subset of a color space's colors that includes the selected color represented by the target color space data 208. The color filtration module 216 is further representative of functionality of the contrast ratio color picker system 104 to generate a filtered palette 114. The filtered palette 114 is representative of an instance of the target color space palette 218, excluding colors that are otherwise included in the target color space palette 218 but fail to satisfy the contrast ratio threshold 214.

Figure 4:
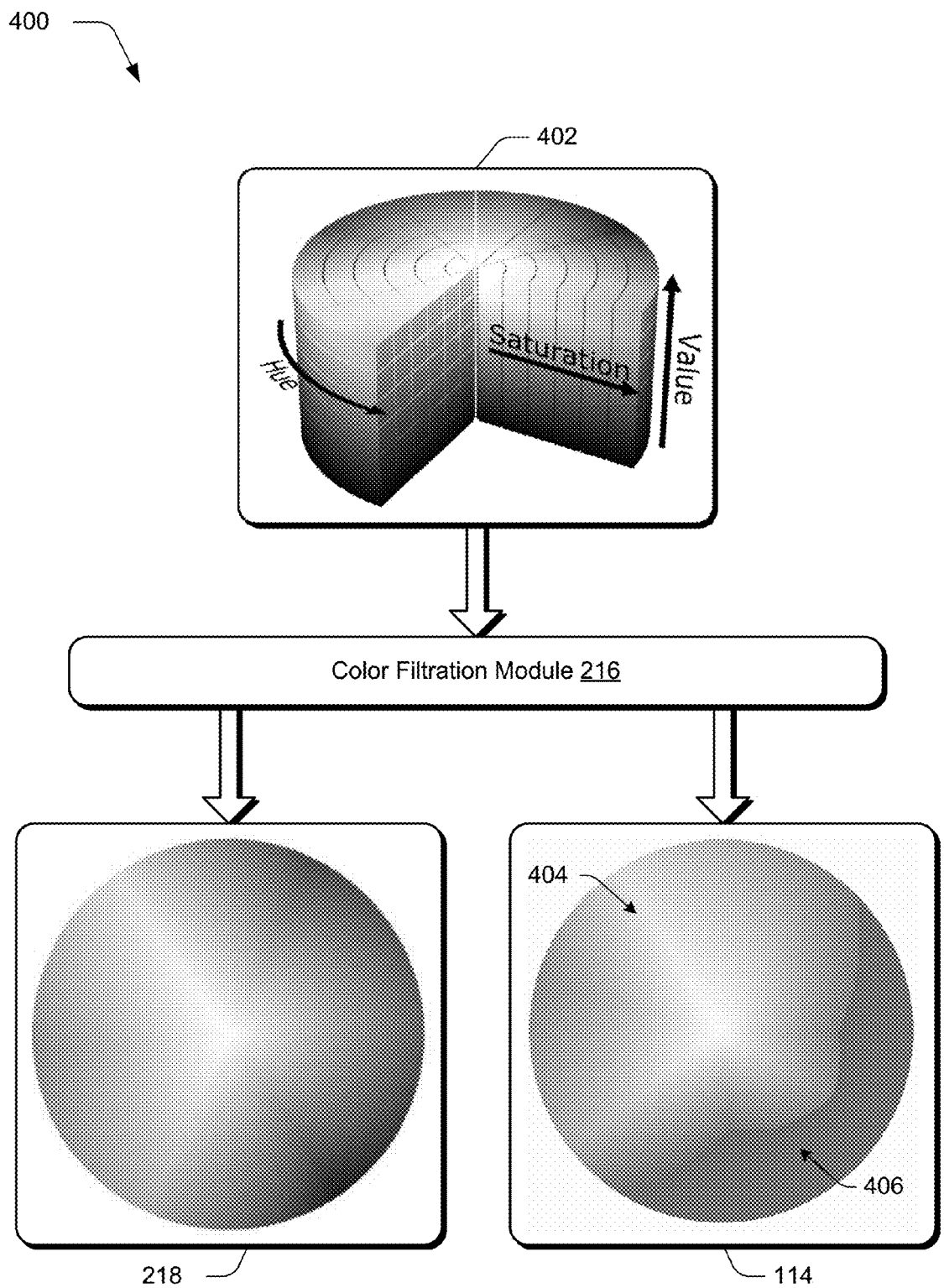
FIG. 4 depicts an example implementation showing operation of a color filtration module implemented by the contrast ratio color picker system of FIG. 1 in greater detail.

As shown in the example implementation 400 of FIG. 4, the color filtration module 216 is configured to generate the target color space palette 218 based on the color selected from the color selection component 110, as represented by the target color space data 208, and generate the filtered palette 114 from the target color space palette 218 based on the contrast ratio threshold 214. As such, in some implementations the target color space palette 218 comprises the color picking surface provided by the color selection component 110.

The example implementation 400 illustrates a scenario where the target color space to be represented by the contrast ratio color picker 112 is the HSV color space. The color gamut 402 represents a visualization of the HSV color space as a cylinder of colors, where colors of each hue are arranged in a radial plane around a central axis of neutral colors that ranges from black at the bottom of the color gamut 402 cylinder to white at the top.

Given the vast number of colors included in a color space, the color filtration module 216 is configured to identify the radial plane of the color gamut 402 that includes the color represented by the target color space data 208 and output the identified radial plane as the target color space palette 218. Although described herein and illustrated in the example implementation 400 in the context of the HSV color space, the color filtration module 216 is configured to generate the target color space palette 218 for any color space, such as by presenting a cross section of an RGB cube, a ring-triangle representing a cross section of an HSL bi-cone, a cross section of an xyY color gamut geometry, and so forth.

Given the target color space palette 218, the color filtration module 216 computes the contrast ratio between the target color space data 208 and the colors represented in the target color space palette 218, and masks portions of the target color space palette 218 containing colors that fail to satisfy the contrast ratio threshold 214. By generating the filtered palette 114 from the target color space palette 218 rather than the entire color gamut from which the target color space palette 218 was generated, the color filtration module 216 conserves computational resources otherwise required to compute the contrast ratio between the selected color and millions of colors in the entire gamut.

Because the amount of colors displayed by the target color space palette 218 depend on a resolution of a display device outputting the target color space palette 218, such as a display device of a computing device implementing the contrast ratio color picker system 104, the color filtration module 216 is configured to generate the filtered palette 114 by processing colors of the target color space palette 218 on a per-pixel basis. In implementations, the color filtration module 216 determines, for each pixel of the target color space palette 218, whether a displayed color satisfies the contrast ratio threshold 214 relative to the color selected from the color selection component 110. Pixels displaying colors that fail to satisfy the contrast ratio threshold 214 are masked from display in the filtered palette 114.

To compute the contrast ratio and mask pixels failing to satisfy the contrast ratio threshold 214, the color filtration module 216 implements a WebGL fragment shader, which further conserves computational resources by processing colors of the target color space palette 218 actually displayed by a display device outputting the target color space palette 218. In this manner, the color filtration module 216 avoids processing colors otherwise included in the target color space palette 218, but not actually output for display, thereby avoiding unnecessary contrast ratio computations in generating the filtered palette 114. The resulting filtered palette 114 thus includes unmasked pixels 404 of the target color space palette 218 representing colors that satisfy the contrast ratio threshold 214 and masked pixels 406, representing colors that fail to satisfy the contrast ratio threshold 214, relative to the color selected from the color selection component 110.

The filtered palette 114 is then provided to the color picker module 220, which is representative of functionality of the contrast ratio color picker system 104 to output the contrast ratio color picker 112 for display at a computing device implementing the contrast ratio color picker system 104. The color picker module 220 is configured to include the filtered palette 114 in the contrast ratio color picker 112 together with at least one parameter control 116. The at least one parameter control 116 enables modification of a corresponding color space parameter that defines the subset of colors from a color space gamut that are included in the target color space palette 218, and consequently the subset of colors satisfying the contrast ratio threshold 214 that result in the filtered palette 114.

Example color space parameters that are modifiable using the at least one at least one parameter control 116 include the relative luminance value 210, the contrast ratio threshold 214, and parameters that are specific to the target color space. Examples of parameters that are specific to a target color space include: Hue, Saturation, and Lightness parameters for an HSL target color space; Red, Green, and Blue parameters for an RGB target color space; Hue, Saturation, and Value parameters for an HSV target color space; Cyan, Magenta, Yellow, and Black parameters for a CMYK target color space; and so forth.

Figure 5:
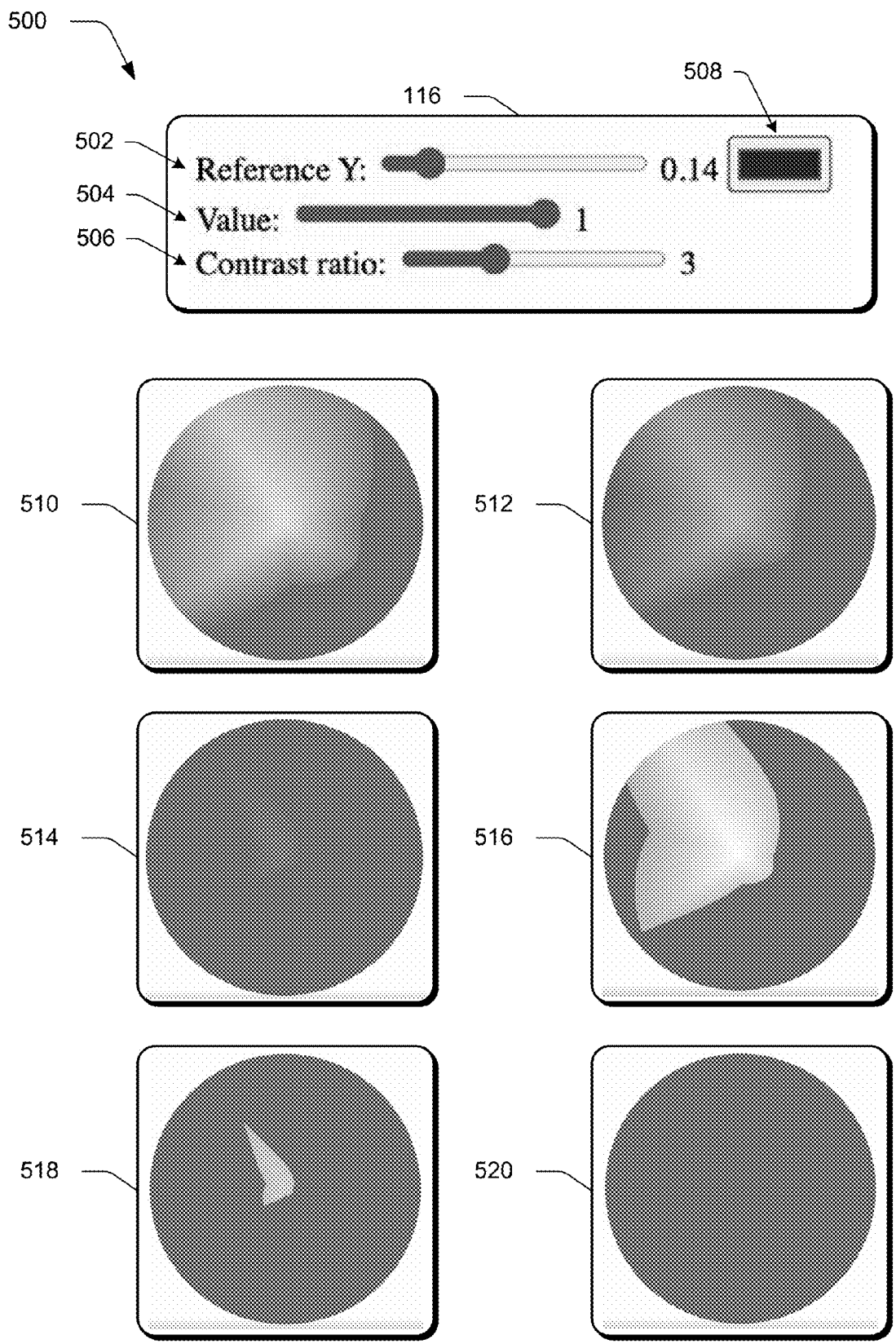
FIG. 5 depicts examples of filtered palettes generated based on inputs to parameter controls of a contrast ratio color picker generated by the contrast ratio color picker system of FIG. 1 in greater detail.

As shown in the example implementation 500 of FIG. 5, the at least one parameter control 116 is useable to cause real-time updates to the filtered palette 114 depicted by the contrast ratio color picker 112, thereby enabling a user of the contrast ratio color picker system 104 to readily understand available colors for use in satisfying a contrast ratio threshold relative to a previously selected color. The example implementation 500 depicts the at least one parameter control 116 as configured for an HSV target color space, with parameter controls 502, 504, and 506 useable to adjust the filtered palette 114 for a selected color, as represented by selected color indicator 508 in the illustrated example.

Parameter control 502 is representative of an instance of the parameter control 116 that is useable to specify the relative luminance value 210 of the selected color. For instance, the example implementation 500 illustrates the relative luminance value 210 for the selected color indicator 508 as being 0.14. The parameter control 502 enables a user of the contrast ratio color picker system 104 to adjust the relative luminance value 210, and consequently the color indicated by the selected color indicator 508. In this manner, parameter control 502 enables the user of the contrast ratio color picker system 104 to readily understand how the relative luminance of a selected color impacts available other colors that are displayable adjacent to the selected color while maintaining a minimum acceptable contrast ratio.

The parameter control 504 is representative of a target color space-specific parameter, which in the example implementation 500, enables a user of the contrast ratio color picker system 104 to adjust a "Value" parameter of the HSV target color space to be used in generating the filtered palette 114. In the context of the HSV color space, the "Value" parameter corresponds to a cross section of the HSV color gamut cylinder to be used as the target color space palette 218. For instance, the example implementation 500 illustrates the parameter control 504 as designating a "Value" parameter of one, which indicates that a top-most cross section of the HSV color gamut cylinder is to be used as the target color space palette 218. Conversely, a "Value" parameter of zero instructs the color picker module 220 to utilize a bottom-most cross section of the HSV color gamut cylinder as the target color space palette 218.

In this manner, parameter control 504 further represents functionality of controlling a target color space-specific parameter for the contrast ratio color picker 112 that both enables intuitive navigation of the target color space's gamut geometry and mitigates computational resources required by the contrast ratio color picker system 104 to generate the filtered palette 114, where the filtered palette 114 represents a subset of colors in the target color space palette 218 that satisfy the contrast ratio threshold 214. The contrast ratio threshold 214 is further adjustable via the at least one parameter control 116, as represented in the example implementation 500 by parameter control 506 designating a 3:1 contrast ratio threshold.

Mitigating computational resources otherwise required to generate the contrast ratio color picker 112 enables implementation of the contrast ratio color picker system 104 among computing device types ranging in different processing capabilities. For instance, depicting the HSV color space using a 24-bit color depth display, as commonly implemented by computing device displays, requires depiction of 16,777,216 distinct colors. Consequently, computing whether each of the over 16 million distinct colors satisfies the contrast ratio threshold 214 relative to the color indicated by the selected color indicator 508 requires a prohibitive amount of computational resources and cannot be performed in real-time by many computing devices (e.g., mobile computing devices having limited processing resources).

By enabling designation of a subset of colors to be included in the target color space palette 218 (e.g., by designating a single cross section of the HSV cylinder via input at the parameter control 504), the contrast ratio color picker system 104 is configured to limit the number of colors processed in generating the filtered palette 114 from the target color space palette 218. Because the number of colors in the target color space palette 218 displayed by a computing device implementing the contrast ratio color picker system 104 is dependent on a display device resolution (e.g., a display device supporting a high resolution will display additional colors of the same target color space palette 218 relative to lower-resolution display device), the color picker module 220 only processes colors output for display in generating the filtered palette 114.

For instance, in generating the filtered palette 114, the color picker module 220 considers whether each pixel of the target color space palette 218 that is output for display satisfies the contrast ratio threshold 214, and masks those pixels that fail to satisfy the contrast ratio threshold 214. In this manner, the color picker module 220 further conserves computing resources required to generate the filtered palette 114 by processing only colors actually output for display, enabling real-time updates to the filtered palette 114 based on inputs received at the at least one parameter control 116. Via this efficient use of computational resources, the contrast ratio color picker system 104 provides real-time updates to the filtered palette 114 based on adjustments to the input color space data 204 as enabled by example parameter control 502, adjustments to the target color space palette 218 as enabled by example parameter control 504, and adjustments to the contrast ratio threshold 214 as enabled by example parameter control 506.

Filtered palettes 510-520 represent example instances of a filtered palette 114 output based on input to the at least one parameter control 116, for a color selected from the color selection component 110 having a relative luminance value 210 represented by parameter control 502 and a visual appearance represented by selected color indicator 508. Filtered palette 510, for instance, represents an instance of the filtered palette 114 resulting from designating an HSV color space "Value" parameter of 0.9 and a contrast ratio threshold 214 of three.

Comparatively, filtered palette 512 and filtered palette 514 represent instances of maintaining the contrast ratio threshold 214 of three, as represented by filtered palette 512, and modifying the "Value" parameter for the HSV color space, with filtered palette 512 representing a "Value" parameter of 0.75 and filtered palette 514 representing a "Value" parameter of 0.56. Filtered palettes 510, 512, and 514 thus visualize different colors available from different cross sections of the HSV color gamut cylinder that satisfy a 3:1 contrast ratio threshold relative to a color indicated by the selected color indicator 508.

As further examples, filtered palette 516 represents an example instance of the filtered palette 114 output for the color indicated by selected color indicator 508 responsive to input modifying the parameter control 504 to designate a "Value" parameter of one and input modifying the parameter control 506 to designate a contrast ratio threshold of 4.5. Filtered palette 518 represents an update to the filtered palette 516 resulting from input further modifying the parameter control 504 to designate a "Value" parameter of 0.84 while maintaining the 4.5:1 contrast ratio threshold. Filtered palette 520 represents an example instance of the filtered palette 114 indicating that no colors from the target color space palette 218 as constrained by the at least one parameter control 116 (e.g., by parameter control 504) are available to satisfy the contrast ratio threshold 214 for the selected color.

In this manner, the contrast ratio color picker system 104 depicts in real-time available colors for satisfying a contrast ratio threshold relative to a selected color and designated color space parameters, thereby enabling a digital content designer to readily understand contrast ratio implications prior to stylization of digital content.

Although depicted as slider controls in the example implementation 500, the at least one parameter control 116 included in the contrast ratio color picker 112 is configurable in a variety of control mechanisms, such as via a scroll wheel, a text input field, one or more selectable icons, combinations thereof, and so forth.

Figure 6:
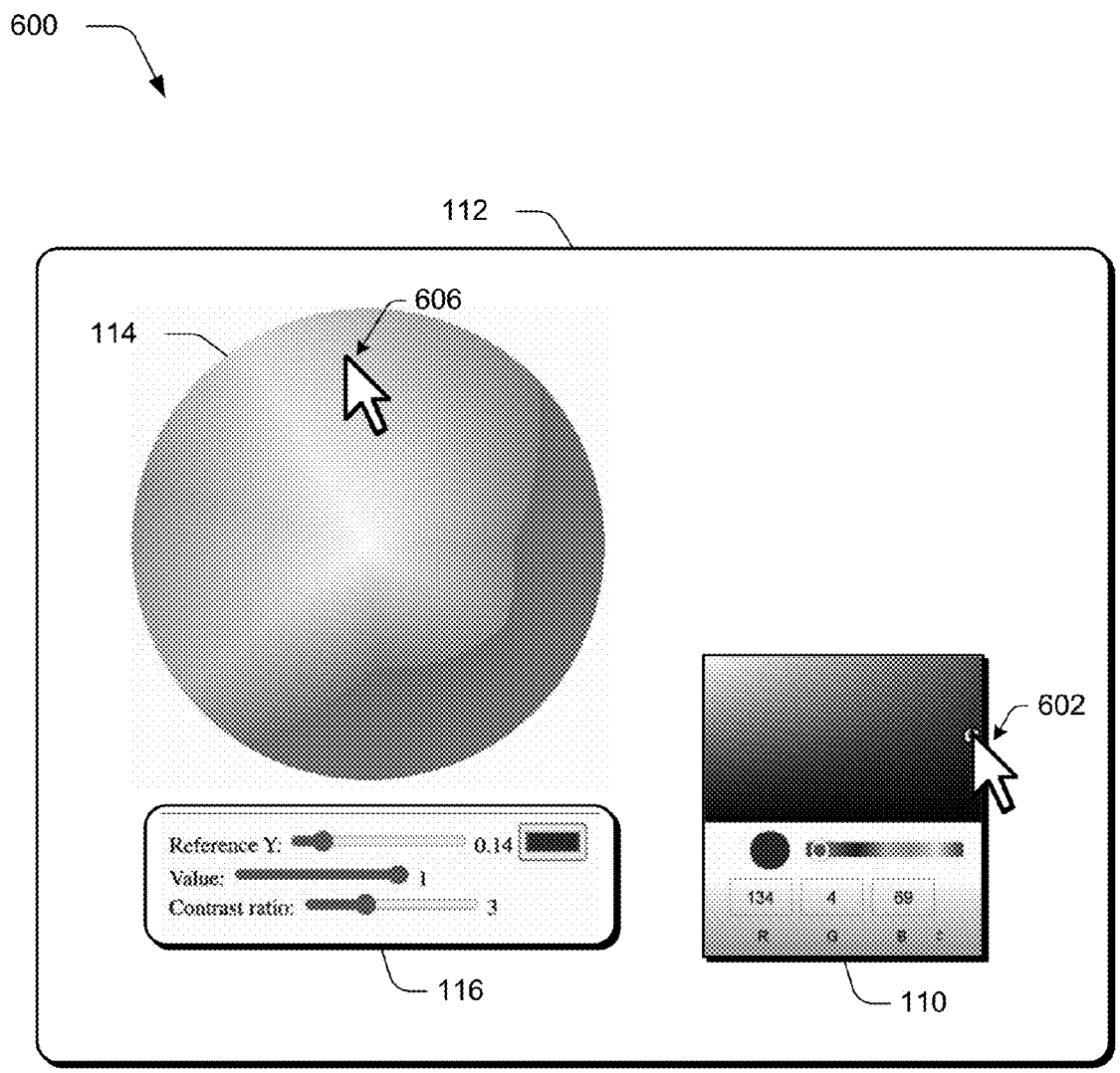
FIG. 6 depicts an example of a user interface for a contrast ratio color picker and digital content generated by the contrast ratio color picker system of FIG. 1.
Figure 6:
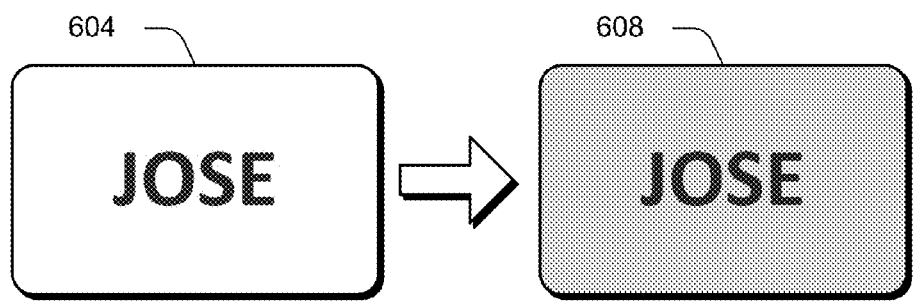

As shown in the example implementation 600 of FIG. 6, the contrast ratio color picker 112 is useable to enable selection of a color from the filtered palette 114 and apply the color selected from the filtered palette 114 to digital content. In the illustrated implementation 600, the contrast ratio color picker 112 includes a color selection component 110, with user input selecting a color to be represented as input color space data 204 from the color selection component 110 via cursor 602. The color selection indicated by cursor 602, for instance, is detected by the color selection module 202 as designating a color of text in digital content 604.

Responsive to the color selection via the color selection component 110, the contrast ratio color picker 112 is updated to display the filtered palette 114, representing a subset of colors in a target color space palette 218 that satisfy a contrast ratio threshold 214 for the selected color. In accordance with one or more implementations, the contrast ratio threshold 214 used to generate the filtered palette 114 is automatically determined by the contrast ratio color picker system 104 based on a context of how the selected color is applied to the digital content 604. For instance, in the example implementation 600, the contrast ratio module 212 is configured to identify that the color selection indicated by cursor 602 is applied to the characters "JOSE" in digital content 604. The contrast ratio module 212, responsive to determining that the characters "JOSE" are formatted in a bold, 35-point font size, automatically determines that the color selection is applied to large text, and that a contrast ratio threshold 214 of 3:1 is to be used in generating the filtered palette 114.

As described above, the color filtration module 216 is configured to generate the filtered palette 114 according to the contrast ratio threshold 214 based on any suitable target color space palette 218, such as a cross section of an HSV color gamut cylinder that includes the color selection indicated in the color selection component 110. Adjustment of the target color space palette 218 used to generate the filtered palette 114 is further enabled via the at least one parameter control 116, as described above with respect to FIG. 5.

In addition to depicting colors that satisfy the contrast ratio threshold 214 relative to the color selected from the color selection component 110, the filtered palette 114 is configured to enable selection of a depicted color and application of the selected color to digital content. For instance, in the example implementation 600, user input at the filtered palette 114 is illustrated via cursor 606 as selecting a color to be applied as a background relative to the text of digital content 604, resulting in the visual appearance of digital content 608. In this manner, the contrast ratio color picker 112 readily informs a designer, during the content creation process, as to colors that are useable together to maintain an acceptable contrast ratio in digital content, and precludes the designer from selecting color combinations that fail to achieve an acceptable contrast ratio.

Having considered example systems and techniques for generating contrast ratio color picker based on a selected color and generating digital content using the contrast ratio color picker, consider now example procedures to illustrate aspects of the techniques described herein.

Example Procedures

The following discussion describes techniques that are configured to be implemented utilizing the previously described systems and devices. Aspects of each of the procedures are configured for implementation in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6.

Figure 7:
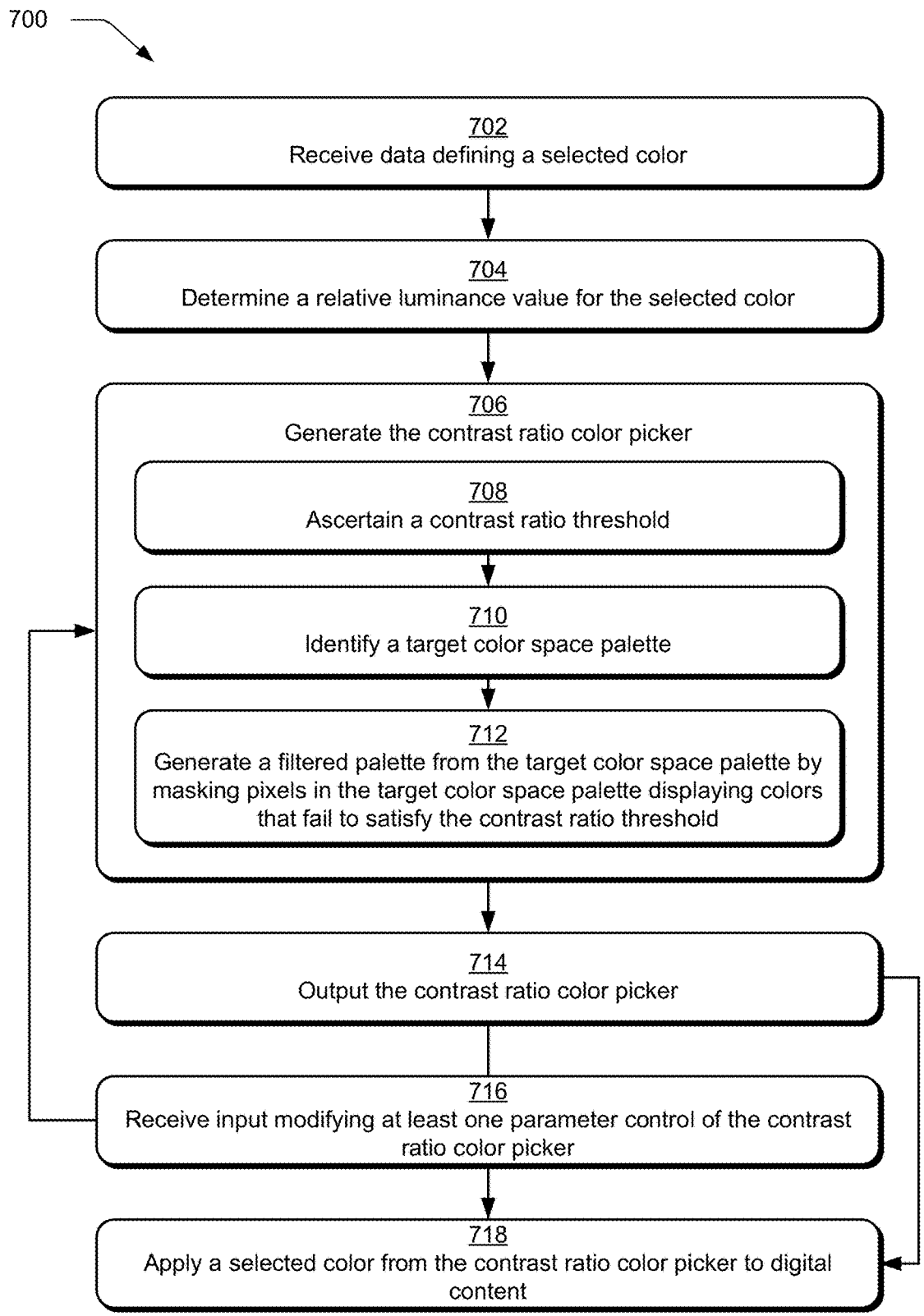
FIG. 7 is a flow diagram depicting a procedure in an example implementation in which a contrast ratio color picker is generated based on a selected color.

FIG. 7 depicts a procedure 700 in an example implementation of generating a contrast ratio color picker in accordance with the techniques described herein. In accordance with one or more implementations, procedure 700 is performed by the contrast ratio color picker system 104 to generate the contrast ratio color picker 112. To do so, data defining a selected color is received (block 702). The color selection module 202, for instance, detects input selecting a color presented for display by the color selection component 110. In some implementations, the color selection component 110 is implemented as native functionality of the contrast ratio color picker system 104. Alternatively, the color selection component 110 is implemented by an application other than the contrast ratio color picker system 104, such as by a word processing application, a graphics processing application, and so forth.

A relative luminance value for the selected color is then determined (block 704). The color identification module 206, for instance, computes the relative luminance value 210 for the selected color using the input color space data 204, which describes the selected color in the context of the color space implemented by the color selection component 110. In other implementations, the color identification module 206 first converts the input color space data 204 to the target color space data 208, which describes the selected color in the context of the color space implemented by the contrast ratio color picker 112, and uses the target color space data 208 to compute the relative luminance value 210.

A contrast ratio color picker is then generated based on the relative luminance value of the selected color (block 706). As part of generating the contrast ratio color picker, a contrast ratio threshold is ascertained (block 708), a target color space palette is identified (block 710), and a filtered palette is generated from the target color space palette by masking pixels in the target color space palette that fail to satisfy the contrast ratio threshold (block 712).

The contrast ratio module 212, for instance, identifies a type of digital content 106 to which the input color space data 204 is selected for application. In example implementations, the contrast ratio module 212 is configured to differentiate as to whether the selected color is to be applied to large text digital content, small text digital content, or graphics digital content, and automatically determine a contrast ratio threshold 214 for the contrast ratio color picker 112 based on the type of digital content stylized by the selected color. Alternatively or additionally, the contrast ratio threshold 214 is specified via input at a computing device implementing the contrast ratio color picker system 104.

The color filtration module 216 is configured to identify the target color space palette 218 in the context of any color space. For instance, in some implementations the color filtration module 216 identifies a palette of a color space implemented by the color selection component 110 that includes the selected color and designates the identified palette as the target color space palette 218. Alternatively, the color filtration module 216 identifies a palette of a target color space to be implemented by the contrast ratio color picker 112 that includes the selected color and designates the identified palette as the target color space palette 218. As another example, the color filtration module 216 selects a random cross section of a color gamut and designates the cross section as the target color space palette 218. In some implementations, the color space used for the target color space palette 218 is designated as a default color space by the contrast ratio color picker system 104, is designated via user input, combinations thereof, and so forth.

The color filtration module 216 generates the filtered palette 114 by processing the target color space palette 218 on a per-pixel basis, based on resolution of a display device used to output the contrast ratio color picker 112. For instance, the color filtration module 216 computes, for each pixel displaying the target color space palette 218, whether the color displayed by the pixel satisfies the contrast ratio threshold 214 and implements a fragment shader to mask pixels of the target color space palette 218 failing to satisfy the contrast ratio threshold 214. The pixel-masked instance of the target color space palette 218 is then output as the filtered palette 114 for the contrast ratio color picker 112.

In some implementations, the color picker module 220 generates the contrast ratio color picker 112 as including at least one parameter control 116, which is representative of a control to adjust the relative luminance value 210, a control to designate a new color selection, a control to adjust at least one color-space parameter defining the target color space palette 218 used to generate the filtered palette 114, a control to adjust the contrast ratio threshold 214, combinations thereof, and so forth. The contrast ratio color picker 112 is then output with the filtered palette 114 and the at least one parameter control 116 (block 714). The contrast ratio color picker system 104, for instance, outputs the contrast ratio color picker 112 at a display device associated with the computing device implementing the contrast ratio color picker system 104.

Input modifying at least one parameter control of the contrast ratio color picker is optionally received (block 716), as indicated by the arrow proceeding from block 714 to block 718 while circumventing block 716. Input modifying the at least one parameter control 116 that indicates a new color selection from the color selection component 110, adjusts the relative luminance value 210, designates a different contrast ratio threshold 214, modifies a color space-specific parameter that designates the target color space palette 218 used in generating the filtered palette 114, or combinations thereof, is received by the computing device implementing the contrast ratio color picker system 104. Responsive to receiving input modifying the at least one parameter control 116, operation returns to block 706 and the contrast ratio color picker 112 is updated in real-time to reflect modifications resulting from the received input. For example, the contrast ratio color picker 112 is updated by replacing the previously displayed filtered palette with an updated filtered palette generated for a new color selection, responsive to receiving input indicating the new color selection via the color selection component 110.

A selected color from the contrast ratio color picker is then applied to digital content (block 718). The color selection module 202, for instance, identifies input selecting a color from the filtered palette 114, such as the example input represented by cursor 606 in FIG. 6. The color selected from the filtered palette 114 is applied to digital content 106, as represented by the illustrated example of implementation 600 applying the selected color to digital content 604 to achieve the visual appearance of digital content 608.

Having described example procedures in accordance with one or more implementations, consider now an example system and device to implement the various techniques described herein.

Example System and Device

Figure 8:
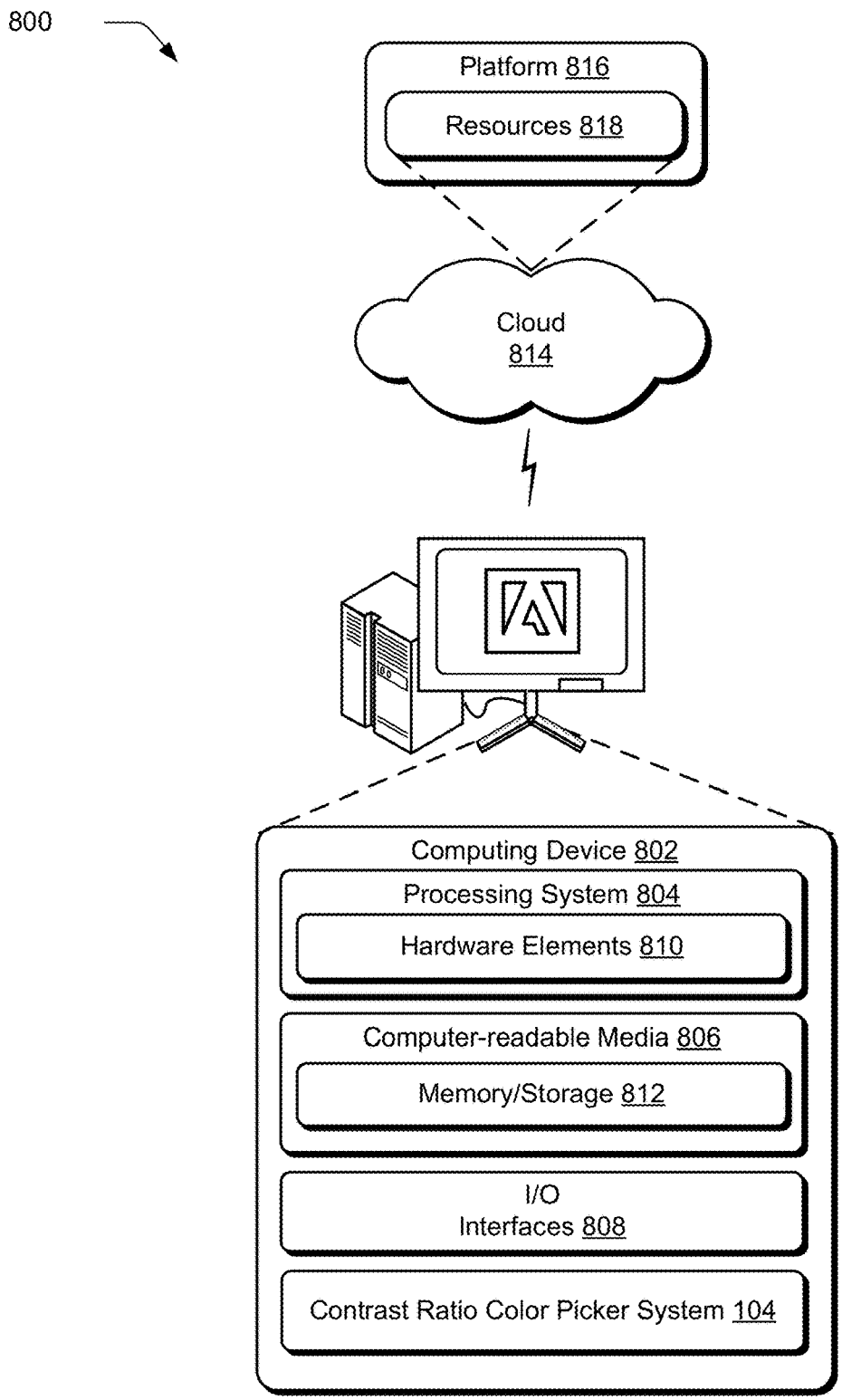
FIG. 8 illustrates an example system including various components of an example device to implement the techniques described with reference to FIGS. 1-7.

FIG. 8 illustrates an example system 800 that includes an example computing device 802, which is representative of one or more computing systems and/or devices that implement the various techniques described herein. This is illustrated through inclusion of the contrast ratio color picker system 104. The computing device 802 is configured, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 is further configured to include a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that are configurable as processors, functional blocks, and so forth. For instance, hardware element 810 is implemented in hardware as an application specific integrated circuit or other logic device formed using one or more semiconductors. The hardware elements 810 are not limited by the materials from which they are formed or the processing mechanisms employed therein. For example, processors are alternatively or additionally comprised of semiconductor(s) and/or transistors (e.g., electronic integrated circuits (ICs)). In such a context, processor-executable instructions are electronically executable instructions.

The computer-readable storage media 806 is illustrated as including memory/storage 812. The memory/storage 812 represents memory/storage capacity associated with one or more computer-readable media. The memory/storage 812 is representative of volatile media (such as random access memory (RAM)) and/or nonvolatile media (such as read only memory (ROM), Flash memory, optical disks, magnetic disks, and so forth). The memory/storage 812 is configured to include fixed media (e.g., RAM, ROM, a fixed hard drive, and so on) as well as removable media (e.g., Flash memory, a removable hard drive, an optical disc, and so forth). In certain implementations, the computer-readable media 806 is configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive, or other sensors that are configured to detect physical touch), a camera (e.g., a device configured to employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is representative of a variety of hardware configurations as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configured for implementation on a variety of commercial computing platforms having a variety of processors.

An implementation of the described modules and techniques are stored on or transmitted across some form of computer-readable media. The computer-readable media include a variety of media that is accessible by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that is employed in some embodiments to implement at least some aspects of the techniques described herein, such as to perform one or more instructions. Hardware, in certain implementations, includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is further configured to be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that is utilized while computer processing is executed on servers that are remote from the computing device 802. Resources 818 also include services provided over the Internet and/or through a subscriber network, such as a cellular or Wi-Fi network.

The platform 816 is configured to abstract resources and functions to connect the computing device 802 with other computing devices. The platform 816 is further configured to abstract scaling of resources to provide a corresponding level of scale to encountered demand for the resources 818 that are implemented via the platform 816. Accordingly, in an interconnected device embodiment, implementation of functionality described herein is configured for distribution throughout the system 800. For example, in some configurations the functionality is implemented in part on the computing device 802 as well as via the platform 816 that abstracts the functionality of the cloud 814.

Conclusion

Although the invention has been described in language specific to structural features and/or methodological acts, the invention defined in the appended claims is not necessarily limited to the specific features or acts described. Rather, the specific features and acts are disclosed as example forms of implementing the claimed invention.

What is claimed is:

1. In a digital medium environment for digital content creation, a method implemented by a computing device, the method comprising:
 detecting, by a color selection module, a selection of a color from a color selection component;
 computing, by a color identification module, a relative luminance value for the color;
 determining, automatically and independent of user input, by a contrast ratio module:
  a type of digital content to be colored using the color; and a contrast ratio threshold for digital content to be colored using the color based on the type of the digital content to be colored; and outputting, by a color picker module, a contrast ratio color picker that includes a filtered palette configured as a color wheel consisting of:
  different colors that satisfy the contrast ratio threshold relative to the color and that are each selectable to apply a corresponding color to the digital content; and
  masked colors that fail to satisfy the contrast ratio threshold relative to the color, the masked colors being visually obscured relative to the different colors and being prevented from selection for application to different digital content.

2. The method of claim 1, wherein the contrast ratio threshold comprises a first contrast ratio responsive to determining that the type of the digital content is small text, a second contrast ratio responsive to determining that the type of the digital content is large text, and a third contrast ratio responsive to determining that the type of the digital content is graphics.

3. The method of claim 1, further comprising generating, by a color filtration module, the filtered palette by:
  identifying a color palette comprising a subset of colors in a color space;
  computing, for each color in the subset of colors, a contrast ratio relative to the color selected from the color selection component; and
  masking colors in the color palette having a computed contrast ratio that fails to satisfy the contrast ratio threshold such that the colors in the color palette having the computed contrast ratio that fails to satisfy the contrast ratio threshold are the masked colors.

4. The method of claim 3, wherein outputting the contrast ratio color picker is performed via a display device comprising a plurality of pixels, wherein computing the contrast ratio is performed for each of the plurality of pixels including a display of the color palette and masking the colors comprises visually obscuring pixels of the plurality of pixels displaying a color associated with a computed contrast ratio that fails to satisfy the contrast ratio threshold.

5. The method of claim 3, wherein masking the colors in the color palette is performed using a fragment shader.

6. The method of claim 3, wherein the contrast ratio color picker includes at least one color space parameter control that is selectable to designate the color palette comprising the subset of colors in the color space used to generate the filtered palette.

7. The method of claim 1, further comprising detecting, by the color selection module, a selection of a different color from the filtered palette and applying the different color to the digital content.

8. The method of claim 1, wherein the contrast ratio color picker includes a contrast ratio control that is selectable to adjust the contrast ratio threshold, the method further comprising receiving input at the contrast ratio control designating an adjusted contrast ratio threshold and modifying the filtered palette to remove display of colors failing to satisfy the adjusted contrast ratio threshold.

9. The method of claim 1, wherein the contrast ratio color picker includes a color selection control that is selectable to change the color selected from the color selection component, the method further comprising detecting selection of a new color via the color selection control and modifying the filtered palette to remove display of colors failing to satisfy the contrast ratio threshold relative to the new color.

10. The method of claim 1, wherein the contrast ratio color picker includes a relative luminance control that is selectable to change the relative luminance value, the method further comprising modifying the filtered palette to remove display of colors failing to satisfy the contrast ratio threshold relative to an updated relative luminance value responsive to detecting input specifying the updated relative luminance value via the relative luminance control.

11. In a digital medium environment for digital content creation, a method implemented by a computing device, the method comprising:
  determining, automatically and independent of user input, by a contrast ratio module:
    a type of digital content to which a selected color is to be applied; and
    a contrast ratio threshold for the digital content based on the type of the digital content;
  displaying, by a color picker module, a contrast ratio color picker that includes a filtered palette configured as a color wheel consisting of:
    a first set of different colors that satisfy the contrast ratio threshold relative to the selected color to be applied to digital content and that are each selectable to apply a corresponding color to the digital content; and
    masked colors that fail to satisfy the contrast ratio threshold relative to the color, the masked colors being visually obscured relative to the first set of different colors and being prevented from selection for application to different digital content;
  detecting, by a color selection module, input designating a different color to be applied to the digital content instead of the selected color;
  generating, by a color filtration module, an updated filtered palette for display as an updated color wheel consisting of:
    a second set of different colors that satisfy the contrast ratio threshold relative to the different color and that are each selectable to apply a corresponding color to the digital content; and
    masked colors that fail to satisfy the contrast ratio threshold relative to the color, the masked colors being visually obscured relative to the second set of different colors and being prevented from selection for application to different digital content; and
  updating, by the color picker module, the contrast ratio color picker by replacing the color wheel with the updated color wheel.

12. The method of claim 11, wherein generating the updated color wheel comprises:
  identifying a color palette used to generate the filtered palette, the color palette comprising a subset of colors in a color space;
  computing, for each color in the subset of colors, a contrast ratio relative to the different color;
  modifying a visual appearance of colors in the color palette having a computed contrast ratio that fails to satisfy the contrast ratio threshold relative to the different color; and
  preventing selection of the colors in the color palette having the computed contrast ratio that fails to satisfy the contrast ratio threshold relative to the different color.

13. The method of claim 12, wherein computing the contrast ratio relative to the different color comprises determining a relative luminance value for the different color and determining a relative luminance value for each color in the subset of colors.

14. The method of claim 12, wherein modifying the visual appearance of the colors in the color palette having the computed contrast ratio that fails to satisfy the contrast ratio threshold relative to the different color comprises masking the colors in the color palette having the computed contrast ratio that fails to satisfy the contrast ratio threshold relative to the different color using a fragment shader configured to visually obscure pixels displaying the colors in the color palette having the computed contrast ratio that fails to satisfy the contrast ratio threshold relative to the different color, such that the colors in the color palette having the computed contrast ratio that fails to satisfy the contrast ratio threshold are the masked colors.

15. The method of claim 11, wherein the contrast ratio color picker includes a relative luminance control that is selectable to specify a relative luminance value for the selected color and the input designating the different color comprises input at the relative luminance control.

16. The method of claim 11, wherein the input designating the different color comprises a selection from a color picker interface presented by one of a word processing application or a digital graphics application.

17. The method of claim 11, wherein the contrast ratio color picker includes a contrast ratio control that is selectable to adjust the contrast ratio threshold, the method further comprising modifying the updated filtered palette based on an updated contrast ratio threshold responsive to receiving input at the contrast ratio control designating the updated contrast ratio threshold.

18. In a digital medium environment for digital content creation, a system comprising:
one or more processors; and
a computer-readable storage medium storing instructions that are executable by the one or more processors to perform operations comprising:
ascertaining a selected color to be applied to digital content;
determining, automatically and independent of user input:
a type of the digital content to which the selected color is to be applied; and
a contrast ratio threshold for the digital content based on the type of the digital content;
outputting a contrast ratio color picker configured as a color wheel that includes a filtered palette consisting of
different colors that satisfy the contrast ratio threshold relative to the selected color and that are each selectable to apply a corresponding color to the digital content; and
masked colors that fail to satisfy the contrast ratio threshold relative to the color, the masked colors being visually obscured relative to the different colors and being prevented from selection for application to different digital content; and
applying one of the different colors to different digital content that is adjacent to the digital content responsive to detecting a selection of the one of the different colors from the filtered palette included in the color wheel.

19. The system of claim 18, wherein determining the contrast ratio threshold for the digital content is performed automatically and independent of user input, based on a type of the digital content.

20. The system of claim 19, wherein the contrast ratio threshold comprises a first contrast ratio responsive to determining that the type of the digital content is small text, a second contrast ratio responsive to determining that the type of the digital content is large text, and a third contrast ratio responsive to determining that the type of the digital content is graphics.

* * * * *